(12) United States Patent
Hineno

(10) Patent No.: US 6,347,066 B1
(45) Date of Patent: Feb. 12, 2002

(54) OPTICAL PICKUP AND OPTICAL DISK APPARATUS

(75) Inventor: Satoshi Hineno, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/605,527

(22) Filed: Jun. 29, 2000

(30) Foreign Application Priority Data

Jun. 30, 1999 (JP) .......................................... P11-184581
Feb. 14, 2000 (JP) .......................................... P12-039755

(51) Int. Cl.⁷ .................................................. G11B 7/12
(52) U.S. Cl. .................................. 369/44.23; 369/112.01
(58) Field of Search ........................... 369/44.11, 44.12, 369/44.23, 44.24, 44.25, 44.28, 112.01, 112.03, 112.27, 118

(56) References Cited

U.S. PATENT DOCUMENTS 4,725,721 A * 2/1988 Nakamura et al. ........ 369/44.24
5,532,987 A * 7/1996 Fujita et al. .............. 369/44.24

* cited by examiner

Primary Examiner—Muhammad Edun
(74) Attorney, Agent, or Firm—Rader, Fishman & Grauer PLLC; Ronald P. Kananen

(57) ABSTRACT

The invention relates to an optical pickup and an optical disk apparatus applicable to, for example, an optical disk apparatus adapted to access a high-density recorded optical disk, so as to realize a simplified structure capable of preventing any characteristic deterioration of a focus error signal caused by horizontal deviation. An optical path length difference generator unit 39 is disposed in an optical path to produce an optical path difference between two luminous fluxes obtained through resolution of return light.

50 Claims, 11 Drawing Sheets

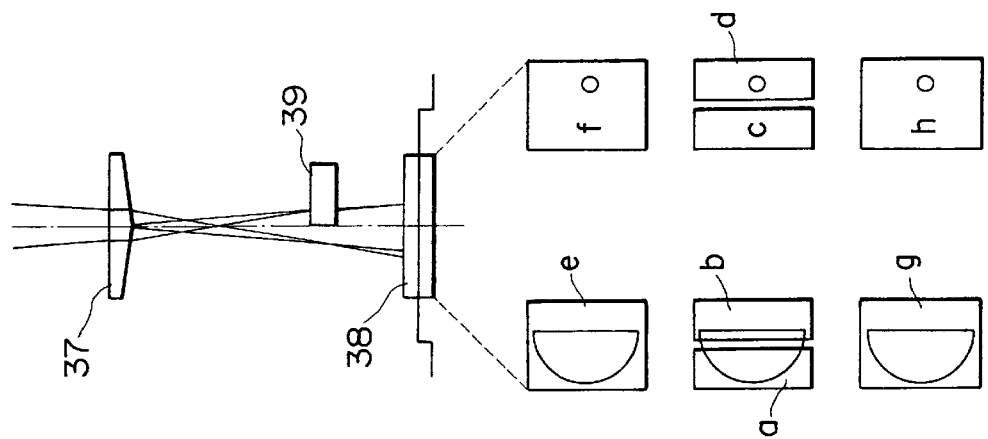
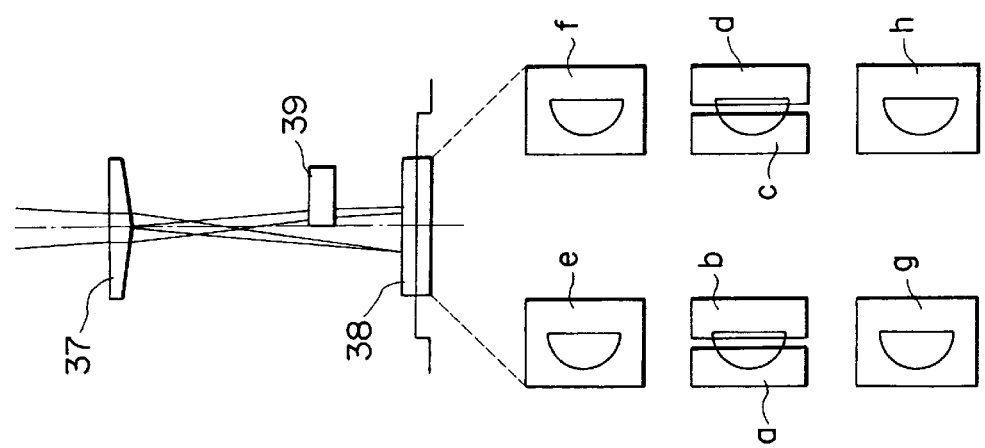
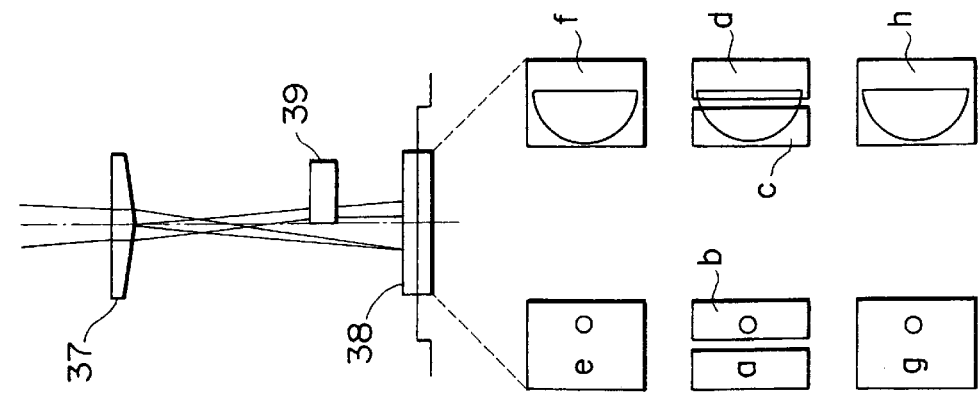

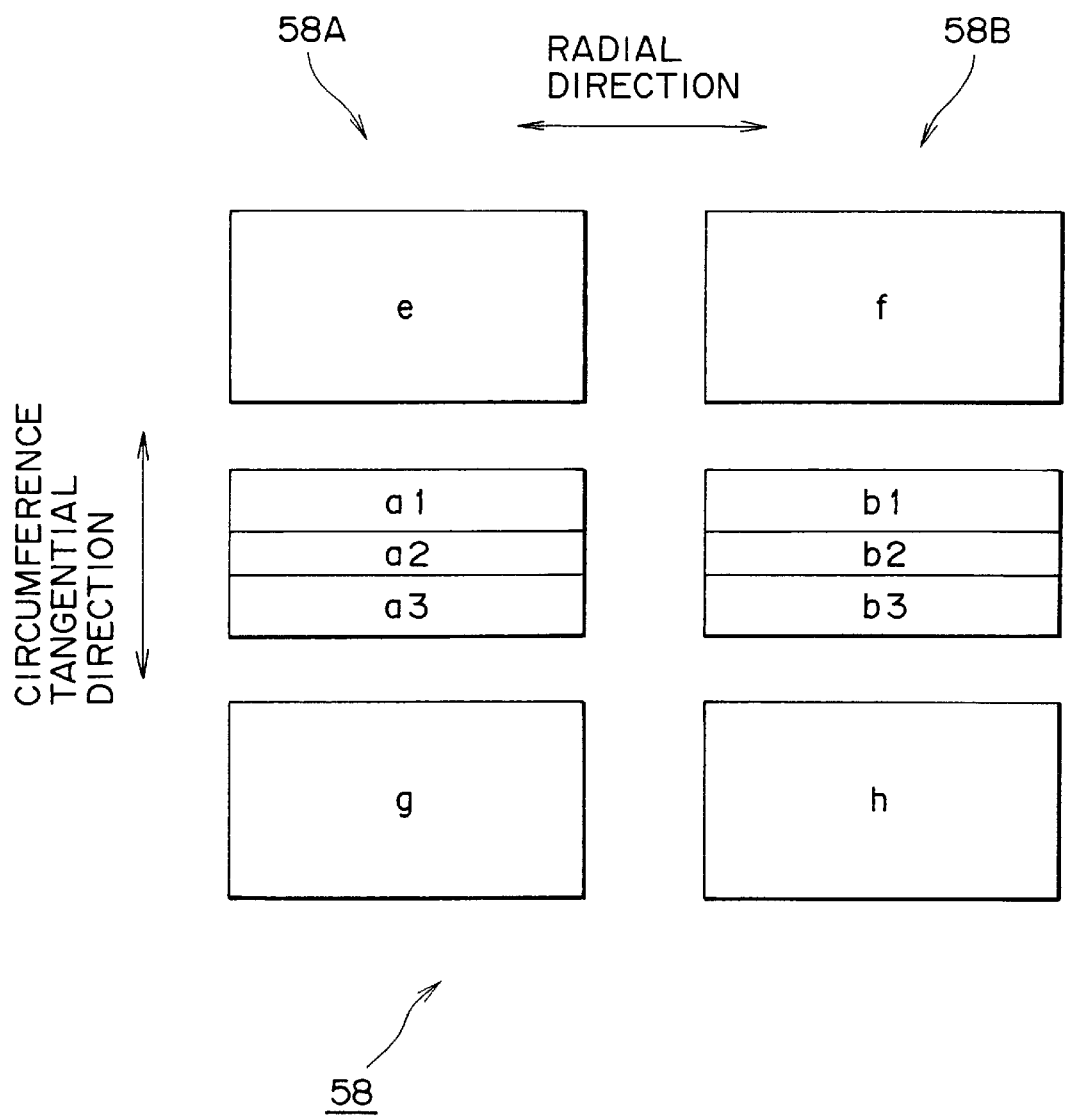

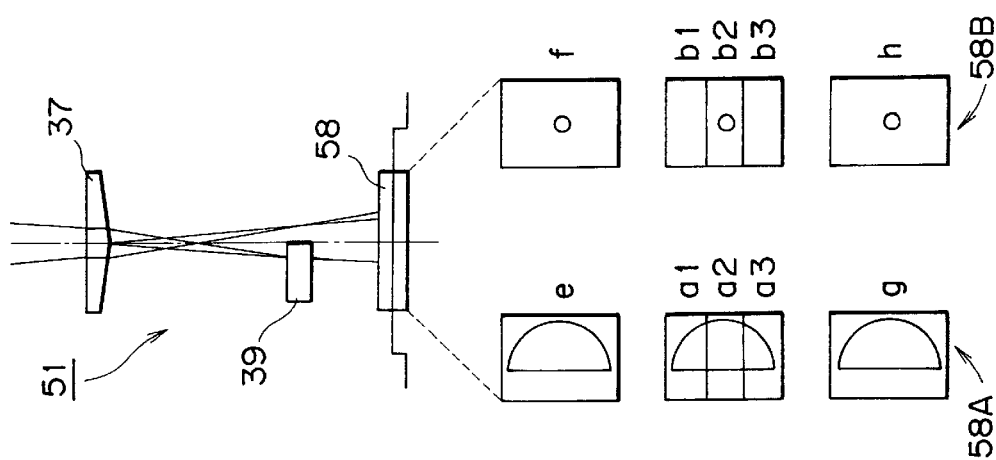
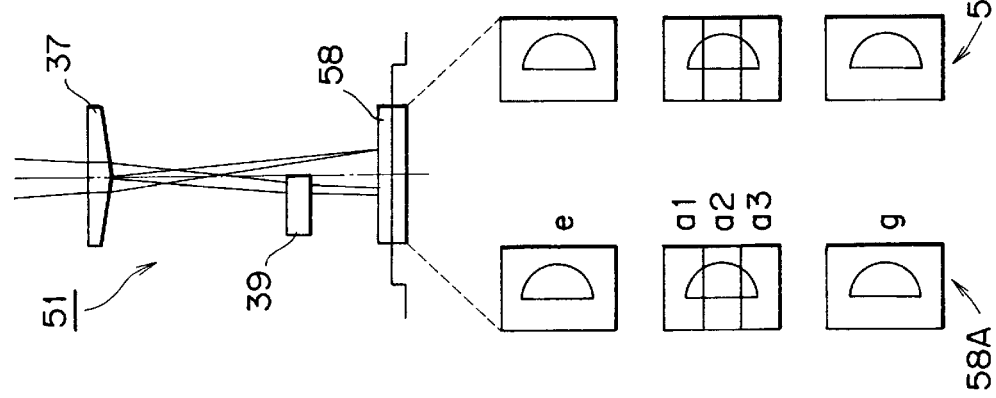
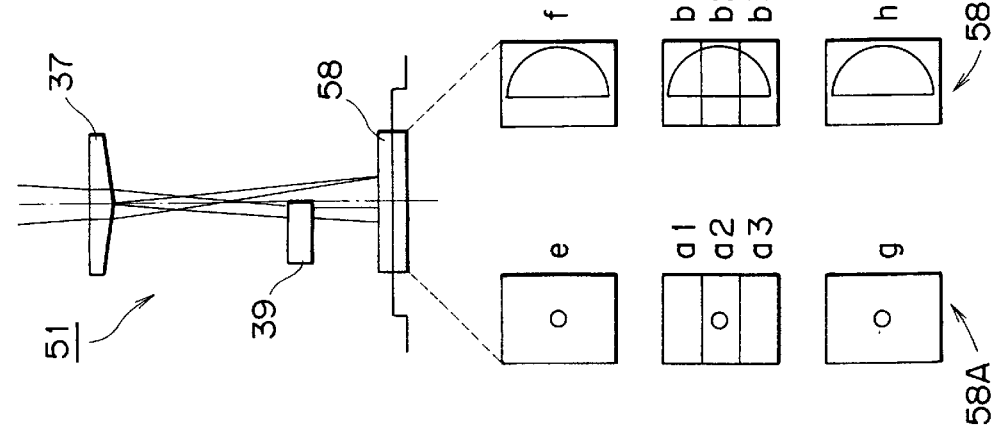

PRIOR ART PRIOR ART PRIOR ART

OPTICAL PICKUP AND OPTICAL DISK APPARATUS

BACKGROUND OF THE INVENTION

1. Technical Field of the Invention

The present invention relates to an optical pickup and an optical disk apparatus, applicable, for example, to an optical disk apparatus adapted to access a high-density recorded optical disk. In the present invention, an optical path length difference generator means is disposed in an optical path to produce an optical path length difference between two luminous fluxes obtained through resolution of return light, hence realizing a simplified structure, which is capable of preventing any characteristic deterioration of a focus error signal that may otherwise be caused by horizontal deviation.

2. Description of Prior Art

In any conventional optical disk apparatus known heretofore, it has been customary that focus control of a laser beam to be irradiated to an optical disk is executed on the basis of a focus error signal of a level changed in accordance with the amount of a focus error. Detection of such a focus error signal is performed by the use of an astigmatism method, Foucault method, SSD (Spot Size Detection) method or the like.

Out of these detection methods mentioned above, when the astigmatism method is applied to an optical disk where land-groove recording is adopted, a positional deviation is detected of a "just focus" position between a land portion and a groove portion. Therefore, in regard to any optical disk adopting such land-groove recording, principally the Foucault method or SSD (Spot Size Detection) method is applied.

FIG. 11(A) is a schematic diagram showing an exemplary optical pickup in which the Foucault method is applied. In this optical pickup 1, a semiconductor laser 2 emits a laser beam L1 therefrom, and a collimator lens 3 converts the laser beam L1 into substantially parallel light rays. A beam splitter 4 reflects the incoming laser beam L1, which is incident thereon from the collimator lens 3, toward an optical disk 5, and then an objective lens 6 condenses the laser beam, which is obtained from the beam splitter 4, onto an information recording plane surface of the optical disk 5.

As a result, return light L2 is obtained from the optical disk 5. Then, this return light L2 is incident upon the beam splitter 4 by way of the optical path of the laser beam L1 in the reverse direction. The beam splitter 4 transmits the return light L2 therethrough to separate the optical path of the laser beam L1 from that of the return light L2. A collimator lens 7 converts the return light, which is emitted from the beam splitter 4, into a converged luminous flux, and then a half mirror 8 splits the return light, which has been converted into such a converged luminous flux, into two luminous fluxes.

A light sensor 9 receives and senses the return light reflected by the half mirror 8. In the optical disk apparatus, the sensed result of the light received by the light sensor 9 is processed through current-to-voltage conversion to thereby generate a reproduced signal RF whose level is changed in accordance with pit trains or the like formed on the optical disk 5. The reproduced signal RF thus obtained is processed to reproduce the data recorded on the optical disk 5.

In a case in which the Foucault method is employed, a Foucault prism 10 is disposed in the optical path of the return light converted into a converged luminous flux as mentioned. The Foucault prism 10 is so shaped that its center protrudes, hence resolving the return light into two luminous fluxes respectively having outgoing directions that are inclined obliquely to the optical axis. In this optical pickup 1, the return light is resolved substantially symmetrically with respect to the optical axis of the return light, and the luminous fluxes mutually intersect in the outgoing directions.

In the optical pickup 1, the return light L2 emitted from the Foucault prism 10 is received by a predetermined light sensor 11. When the light receiving plane of the light sensor 11 and the information recording plane surface of the optical disk 5 are held in a conjugate relation, as shown in FIG. 11(C), the two luminous fluxes form respective focal points on the light receiving plane of the light sensor 11. Consequently, two beam spots SP1 and SP2 are formed by the two luminous fluxes (hereinafter this state will be referred to as a "just focus state").

When an objective lens 6 is moved toward the information recording plane of the optical disk 5 and the emission point of the return light recedes equivalently from the objective lens 6, the two beam spots SP1 and SP2 formed on the light receiving plane are positionally changed in a manner to approach the optical axis. Also, the shapes thereof are enlarged as shown in FIG. 11(B), since the outgoing directions of such two beam spots are so inclined as to mutually intersect by the Foucault prism 10.

To the contrary, when the objective lens 6 is moved away from the information recording plane of the optical disk 5 and the emission point of the return light equivalently approaches the objective lens 6, the two beam spots SP1 and SP2 formed on the light receiving plane are positionally changed in a manner to recede from the optical axis and also the shapes thereof are enlarged as shown in FIG. 11(D).

Utilizing such relationship, there are formed, as shown in FIGS. 11(A), 11(B), and 11(C), in the light sensor 11, light receiving planes 11A and 11B defined by respectively dividing the light receiving plane into two areas a, b and c, d in directions where the respective focal points of the beam spots SP1 and SP2 are changed with reference to the return-light focal point in the just focus state. In the optical disk apparatus, the sensed results of the received light in such areas a to d are processed through current-to-voltage conversion, and the results of the current-to-voltage conversion are represented by codes which correspond respectively to the areas a to d, thereby generating a focus error signal FE expressed by an arithmetic equation of $$FE=(a+d)-(b+c).$$

Further, the objective lens 6 is so moved as to reduce the level of the focus error signal FE to zero as indicated by an arrow A, hence executing focus control.

FIG. 12 is a perspective view showing principal portions of a light accumulator applied to an optical pickup that is based on the SSD method. In this optical pickup, a laser beam L1 emitted from the light accumulator 15 is condensed on an optical disk by means of an objective lens, and return light L2 obtained from the optical disk is received via the objective lens and then is introduced to the light accumulator 15.

The light accumulator 15 reflects the laser beam L1, which is emitted from a semiconductor laser diode chip 17, onto an inclined surface 16A of a prism 16 produced by cutting a glass material, and then sends the laser beam L1 toward the objective lens.

The light accumulator 15 introduces the return light L2, which is reflected by way of the optical path of the laser beam L1 in the reverse direction, from the inclined surface 16A into the prism 16, and then separates the return light L2 into transmitted light and reflected light by the lower plane of the prism 16. The light accumulator 15 of FIG. 12 enables a light sensor 18 to receive the transmitted light obtained through the lower plane of the prism 16. The light accumulator 15 further reflects the reflected light from the lower plane of the prism 16 by the upper plane thereof and, after transmitting the reflected light through the lower plane, enables the light sensor 19 to receive the reflected light. Thus, the optical pickup using this light accumulator 15 is so structured that the diameters of beam spots formed on the respective light receiving planes of the light sensors 18 and 19 are substantially equalized to each other in a just focus state. If the distance to the optical disk is changed from the just focus position, the diameters of the beam spots formed on the respective light receiving planes of the light sensors 18 and 19 are changed complementarily in accordance with the direction of such change.

The light sensors 18 and 19 are constituted integrally on a single semiconductor substrate. In the light sensors 18 and 19, the light receiving planes are so divided as to be capable of detecting the shapes of return-light beam spots formed on the respective light receiving planes. In the optical disk apparatus employing such optical pickup, the sensed results of the received light detected on the light receiving planes of the light sensors 18 and 19 are processed through current-to-voltage conversion, and then the results of such current-to-voltage conversion are calculated to generate a focus error signal in conformity with the diameters of the beam spots formed respectively on the light sensors 18 and 19.

In comparison with the above example, FIG. 13 is a perspective view showing another light accumulator 21 applied to an optical pickup based similarly on the SSD method. In this optical pickup, the return-light optical system subsequent to the collimator lens 7 described in regard to FIG. 11 is replaced with the light accumulator 21.

The light accumulator 21 of FIG. 13 comprises a composite prism 24 which consists of a right-angled triangular prism 22 and a parallelogrammic prism 23 (i.e., a prism having a parallelogram shape) adhered to an oblique surface of the right-angled triangular prism 22, wherein the composite prism 24 is disposed on light sensors 25 and 26. These light sensors 25 and 26 are constituted integrally on a single semiconductor substrate. Similarly to the light sensors 18 and 19 described above in regard to FIG. 12, the light receiving planes are so divided as to be capable of detecting the diameters of beam spots formed respectively on the light receiving planes.

The light accumulator 21 of FIG. 13 inputs return light L2 from the composite prism 24, and then resolves the return light L2 into transmitted light and reflected light by the joined surfaces of the right-angled triangular prism 22 and the parallelogrammic prism 23. The light accumulator 21 receives, by the light sensor 25, the transmitted light obtained through the lower surface of the composite prism 24, while it receives, by the light sensor 26, the reflected light obtained from the inclined plane and transmitted through the lower surface of the composite prism 24.

In the optical disk apparatus employing such optical pickup, the sensed results of the received light detected by the light sensors 25 and 26 are processed in the same manner as in the aforementioned optical disk apparatus described in regard to FIG. 12, whereby a focus error signal is generated.

Such prior efforts had experienced difficulties. In the light sensor 11 based on the Foucault method, there is formed a dead region AR (FIG. 11), which is a slit-shaped zone completely unused for reception of any return light, between the areas a and b, and also between the areas c and d defined by dividing the light receiving planes 11A and 11B.

When a just focus state is kept in the optical disk apparatus based on the Foucault method, the entire amount of the return light is condensed onto the dead region AR, so that it becomes necessary to prepare an exclusive light sensor for detection of a reproduced signal RF. Consequently, when the Foucault method is adopted, there arises a problem that the optical pickup is structurally complicated.

If the light sensor 11 is horizontally deviated, as shown in FIG. 14(A), in the direction of the array of its light receiving planes 11A and 11B, then the return light is condensed onto only one of the divided areas even in a just focus state. In this condition, as compared with another case of FIG. 14(B) without any positional deviation, there is formed a dead region, where the level of a focus error signal FE is not changed at all, in the vicinity of the just focus point, as shown in FIG. 14(C). Thus, in case the Foucault method is adopted, another problem is existent in that the focus error signal characteristic is extremely deteriorated due to such a horizontal positional deviation to eventually bring about a disadvantage of requiring a time for adjustment to attain a positional coincidence.

For solution of the above problems, there may be contrived a mode of employing the SSD method described in connection with FIGS. 12 and 13. However, it is difficult in such a mode to apply a three-spot tracking control process and is impossible to flexibly comply with any structural change.

The present invention has been accomplished in view of the points mentioned above. It is thus an overall object of the invention to provide an optical pickup of a simplified structure that is capable of preventing, even in focus control by the Foucault method, any characteristic deterioration of a focus error signal derived from a horizontal positional deviation. Another object of the invention resides in providing an optical disk apparatus where such an optical pickup is used.

SUMMARY OF THE INVENTION

For the purpose of solving the problems mentioned, the invention, when applied to an optical pickup or an optical disk apparatus, an optical path length difference generator means for rendering different the lengths of the optical paths of two luminous fluxes obtained by resolving return light.

According to the structure of the invention, an optical path length difference generator means is provided for rendering different the lengths of the optical paths of two luminous fluxes obtained by resolving return light, so that even when one luminous flux forms a focal point on the light receiving plane, the other luminous flux is condensed, on the light receiving plane, in the shape of a large beam spot anterior or posterior to the focal point.

Therefore, if the configuration is so arranged as to generate a focus error signal by dividing the light receiving plane in a manner to detect the diameters of beam spots, it is still possible to avoid an undesired situation where the entire amount of the return light is condensed on a dead region of a light sensor, and thus a reproduced signal can be obtained from the sensed results of the received light used for generation of the focus error signal. Consequently, the whole structure can be simplified correspondingly thereto.

When the lengths of the optical paths are thus rendered different from each other, if focus control is so executed as to equalize the diameters of beam spots formed by two luminous fluxes on the light receiving planes, then one luminous flux is condensed anterior to the focal point while the other luminous flux is condensed posterior to the focal point. Accordingly, in comparison with a known case where respective focal points are formed, focus control can be so executed as to attain a control target state with large beam diameters, hence achieving effective avoidance of any sharp characteristic change of the focus error signal derived from the horizontal positional deviation.

BRIEF DESCRIPTION OF THE DRAWINGS

In the drawings:

FIG. 3, having FIGS. 3(A) to 3(C), is a schematic diagram for explaining the operation of the optical pickup shown in FIG. 1.

FIG. 7 is a plan view of light receiving planes of a light sensor used in an optical pickup of a third embodiment of the present invention.

FIG. 8, having FIGS. 8(A) to 8(C), is a schematic diagram for explaining the operation of the optical pickup shown in FIG. 7.

DETAILED DESCRIPTION OF THE PREFERRED EMBODIMENTS

Hereinafter some preferred embodiments of the present invention will be described in detail with reference to the accompanying drawings.

(1) First Embodiment (1-1) Structure of First Embodiment

Figure 1:
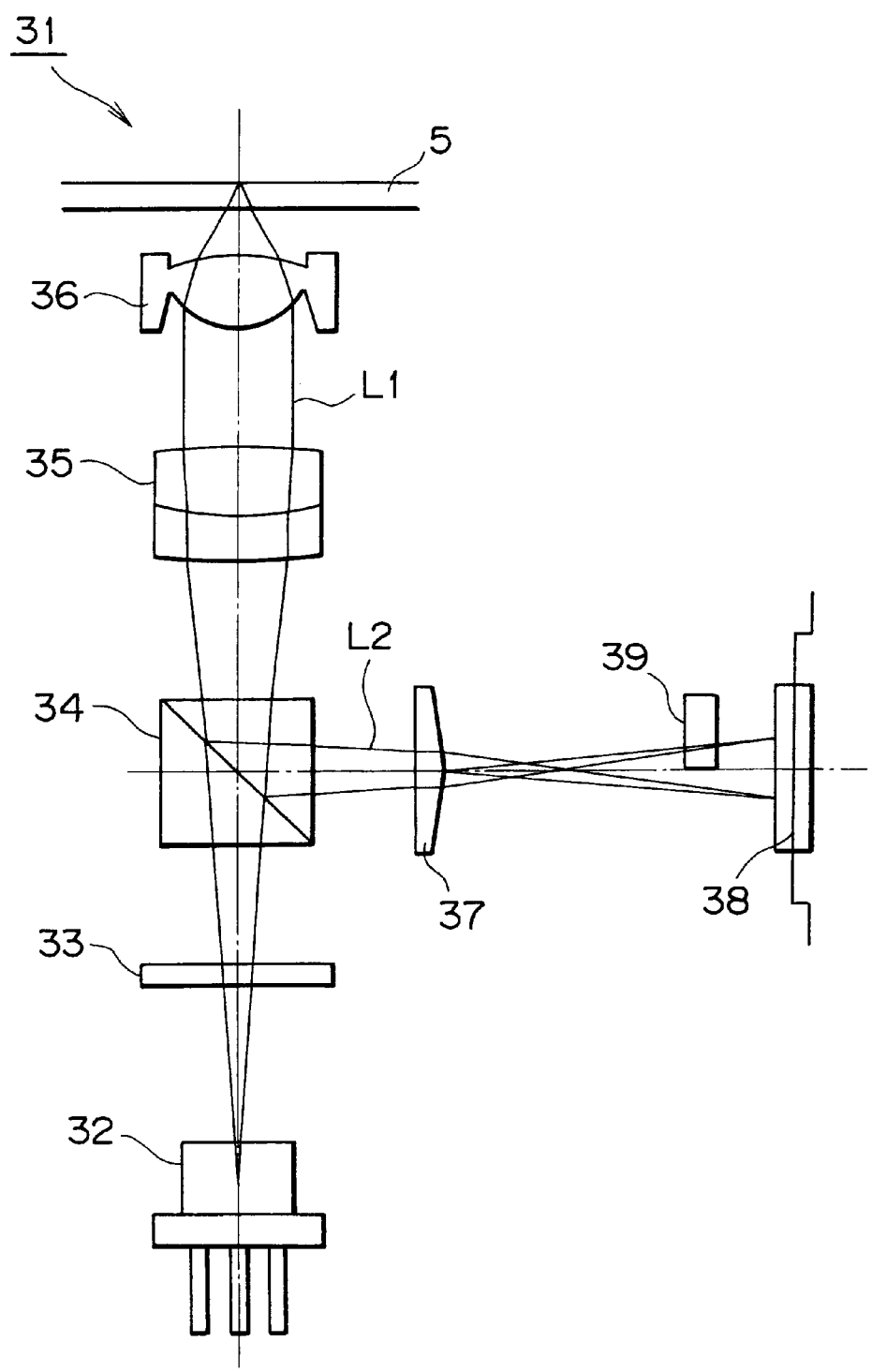
FIG. 1 is a schematic diagram of an optical pickup showing a first embodiment of the present invention.

FIG. 1 is a schematic diagram of an optical pickup showing a first embodiment of the present invention. In an optical disk apparatus represented by this embodiment, an optical disk 5 is accessed by the use of the optical pickup 31 according to the invention.

In this optical pickup 31, a semiconductor laser 32 emits a laser beam L1 therefrom, and a grating 33 resolves the laser beam L1 into −1st, 0th and 1st-degree diffracted light rays and then emits the same. A beam splitter 34 transmits the incident laser beam L1 from the grating 33 toward the optical disk 5, and a collimator lens 35 converts the laser beam L1 substantially into parallel light rays. Then an objective lens 36 condenses the laser beam L1 from the collimator lens 35 onto an information recording plane of the optical disk 5.

Figures 11A, 11B, 11C, 11D:
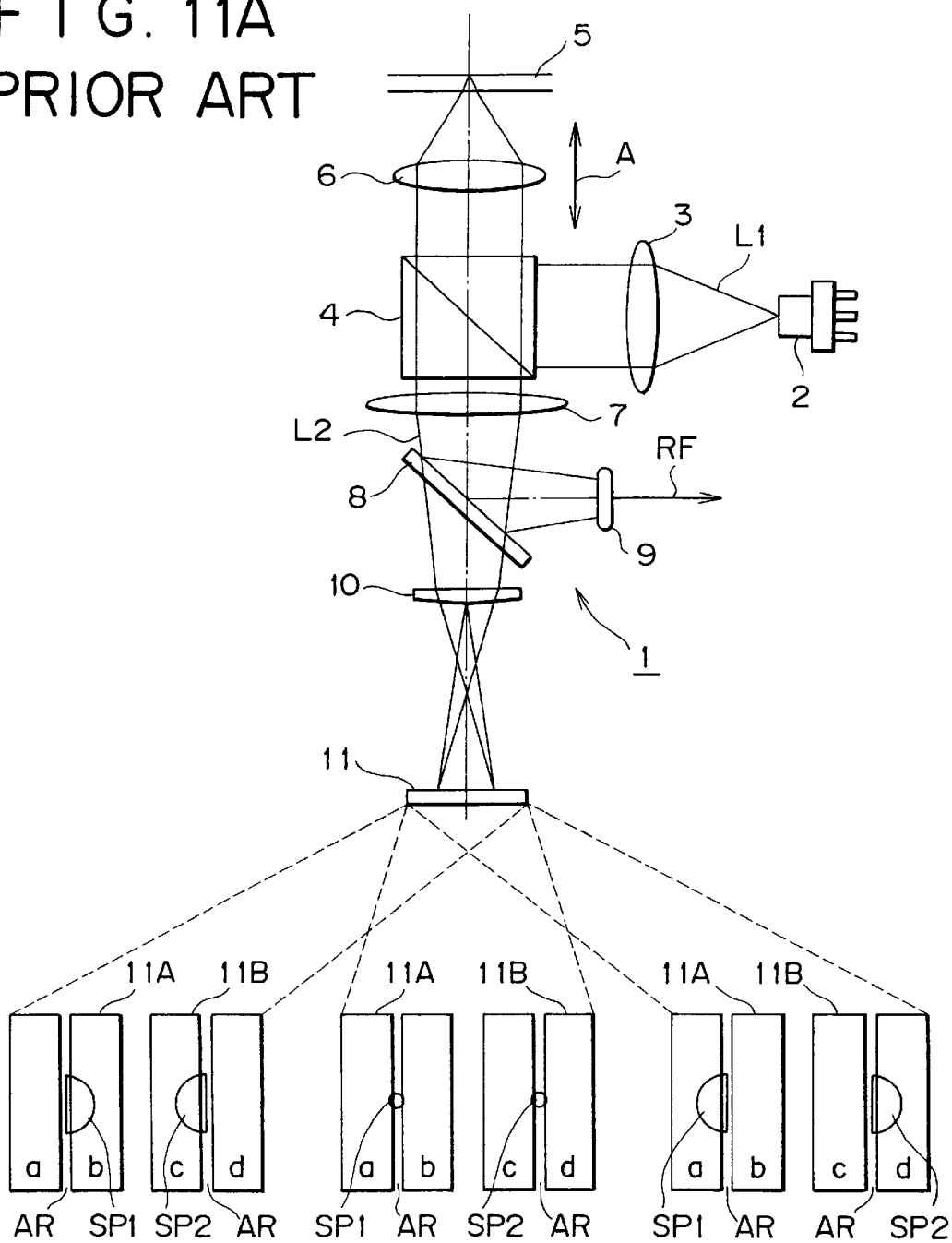
FIG. 11 is a schematic diagram of a conventional optical pickup based on the SSD method.
Figure 12:
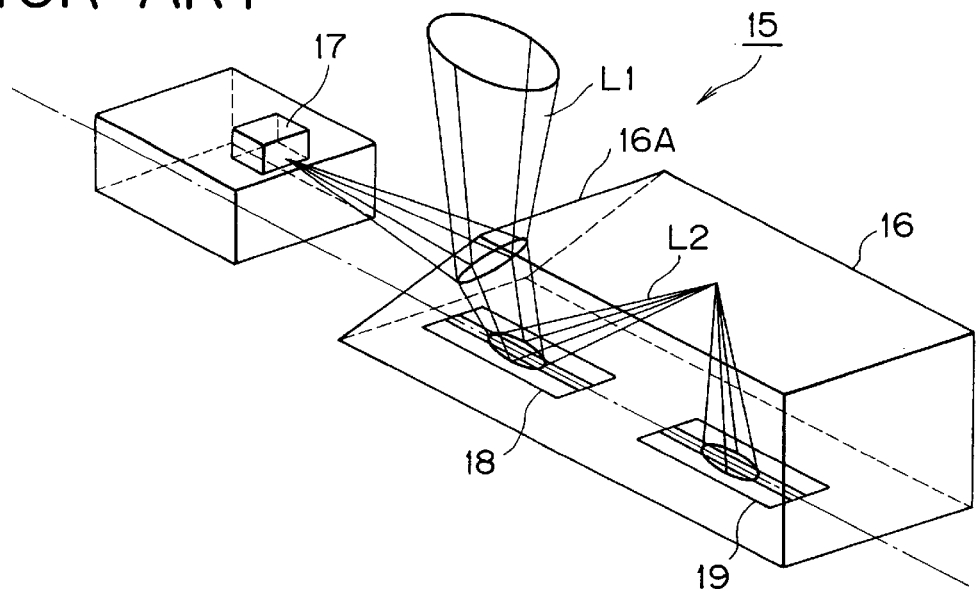
FIG. 12 is a perspective view of a light accumulator for use in a conventional optical pickup based on the SSD method.
Figure 13:
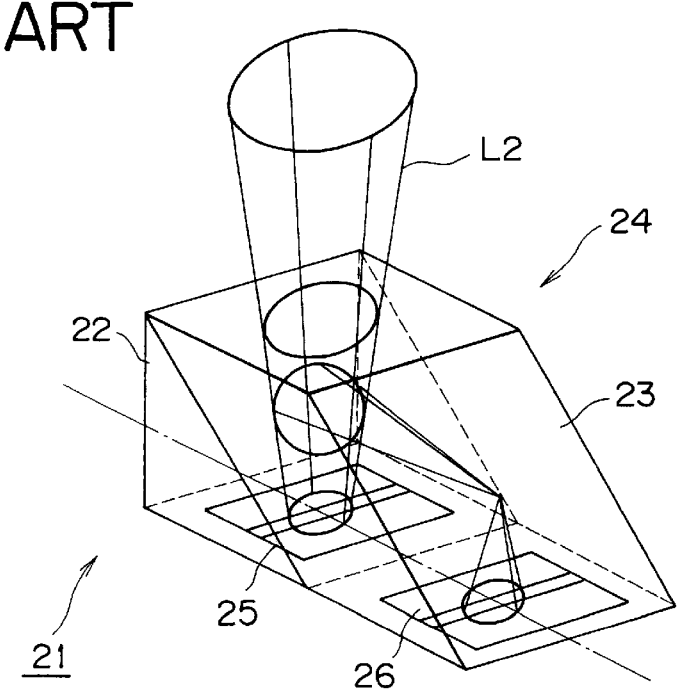
FIG. 13 is a perspective view of another light accumulator for use in a conventional optical pickup based on the SSD method.
Figure 14A:
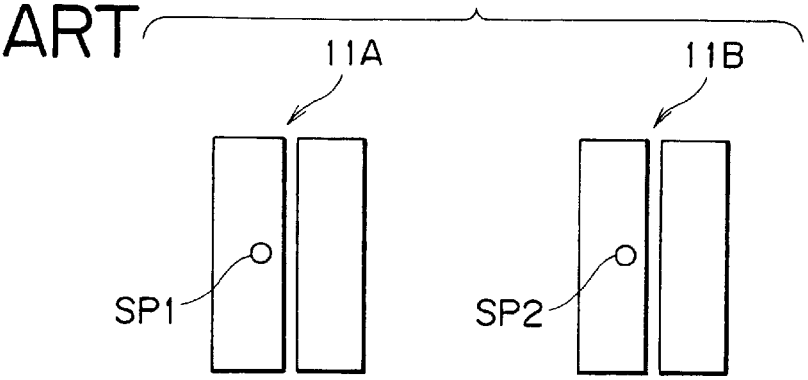
Figure 14B:
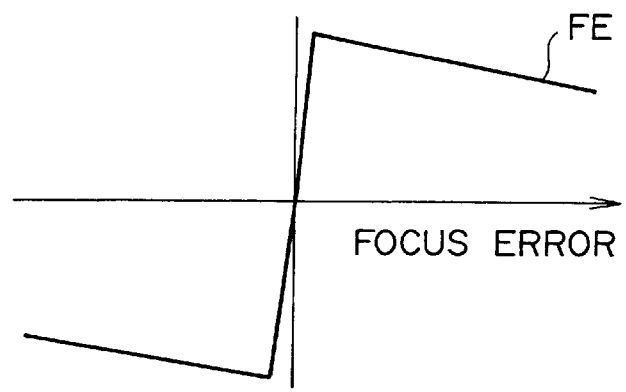
Figure 14C:
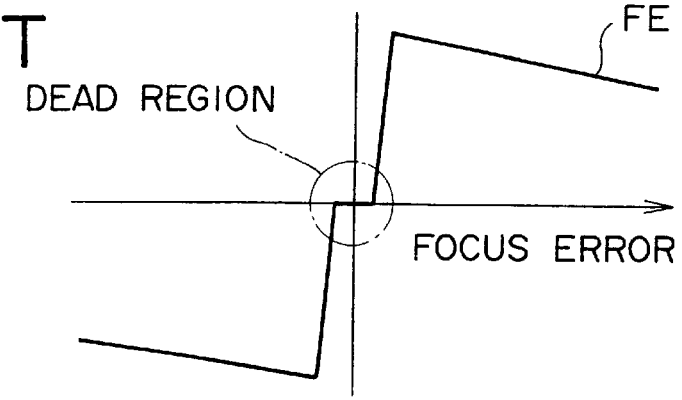

In the optical pickup 31, the laser beam L1 is thus irradiated to the optical disk 5, and return light L2, which is composed of convergent light obtained by way of the optical path of the laser beam L1 in the reverse direction, is incident on the beam splitter 34. Subsequently the return light L2 is reflected by the beam splitter 34, so that the optical path of the laser beam L1 and that of the return light L2 are separated from each other. A Foucault prism 37 resolves the return light L2, which has been reflected by the beam splitter 34, into two luminous fluxes, similarly to the Foucault prism 10 described in connection with FIG. 11, and then a light sensor 38 receives such two luminous fluxes.

In the optical pickup 31, an optical path length difference plate 39 is disposed in the optical path of one resolved return light so as to change the optical path length of the transmitted light in comparison with another case where such a plate is not provided. This optical path length difference plate 39 consists of a transparent parallel flat plate having a refractive index N and a thickness d, and serves to render different, by a dimension D=d(N−1)/N, the optical path length of one luminous flux, which is incident on the light sensor 38 on the side without such optical path length difference plate 39, from the optical path length of the other luminous flux transmitted through the optical path length difference plate 39.

Figure 2:
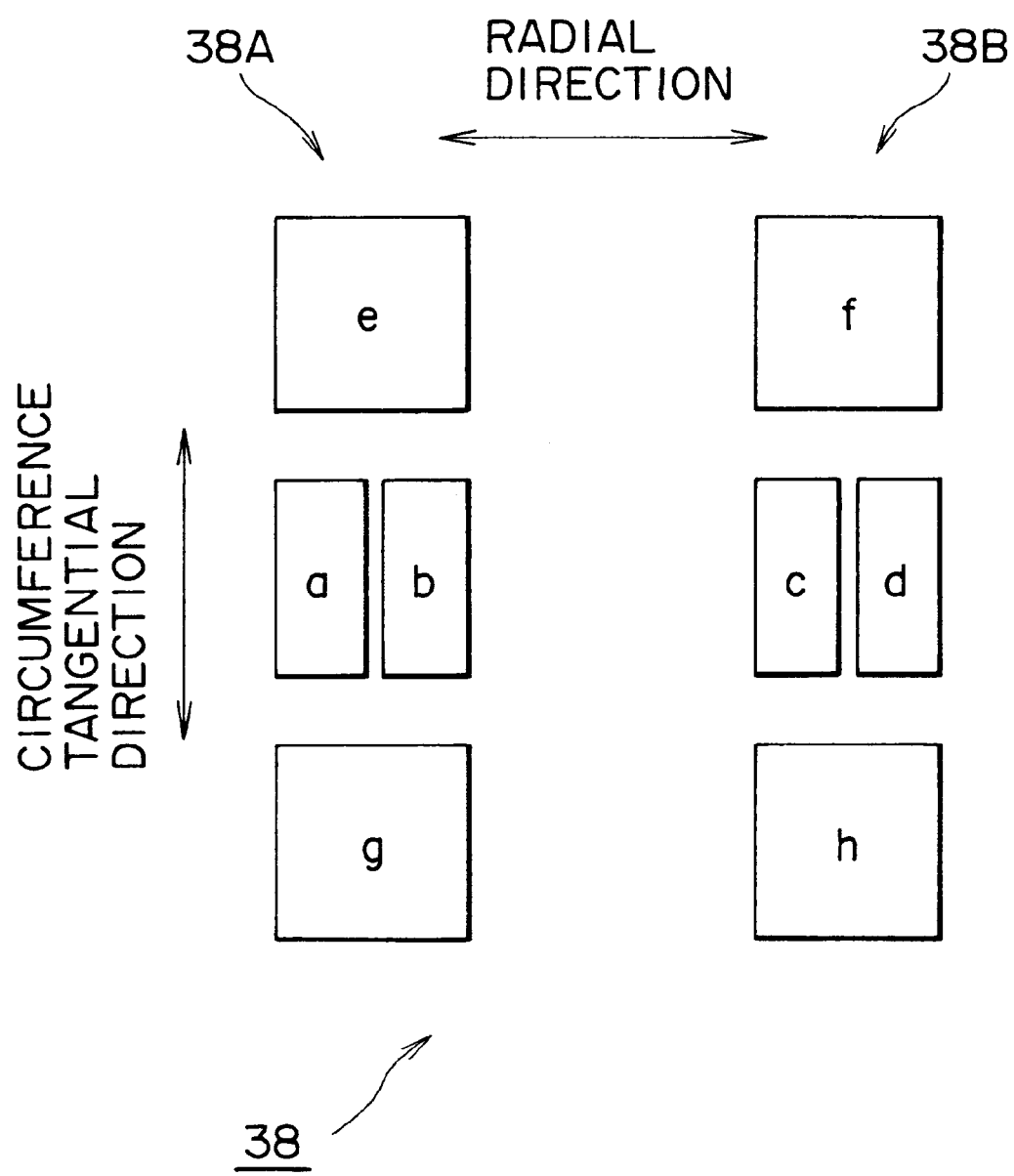
FIG. 2 is a plan view of light receiving planes of a light sensor in the optical pickup of FIG. 1.

FIG. 2 is a plan view showing light receiving planes of the light sensor 38. In the light sensor 38, two sets of light receiving planes 38A and 38B are formed substantially in the radial direction of the optical disk 5. Such two sets of light receiving planes 38A and 38B are shaped to be the same, and rectangular light receiving planes e, ab, g and f, cd, h are formed at a predetermined pitch substantially in the circumference tangential direction of the optical disk 5. In the light sensor 38, the center light receiving planes ab and cd, out of the entire rectangular light receiving planes e, ab, g and f, cd, h, are divided into two in the direction of the array of the light receiving planes 38A and 38B, and further tiny light receiving planes a, b and c, d are formed.

In the optical pickup 31, the two sets of light receiving planes 38A and 38B are so positioned as to receive, respectively, the return light incident via the optical path lengthdifference plate 39 and the remaining return light. The component parts of the optical pickup 31 are so disposed that, when the laser beam of 0th-degree diffracted light, out of the entire laser beam L1 of −1st, 0th and 1st-degree diffracted light divided by the grating 33, is scanning the optical disk 5 in a just tracking state, the laser beams of −1st and 1st-degree diffracted light respectively scan the inner and outer peripheries of target tracks to be scanned, and also that the return light rays corresponding to the −1st, 0th and 1st-degree diffracted light rays are received respectively by the light receiving planes e, ab, g and f, cd, h.

In the optical disk apparatus, the sensed results of the received light obtained from the light receiving planes a to h are processed through current-to-voltage conversion, and a tracking error signal TE is generated by executing the calculation expressed below. Then the objective lens 36 is moved in the radial direction of the optical disk 5 for adjusting the tracking error signal TE to a predetermined signal level, whereby tracking control is performed according to the DPP (Differential Push Pull) method. It is to be noted that the character A denotes the predetermined coefficient.

[Expression 1]

$$TE=(a+b-c-d)-A(e+g-f-h) \quad (1)$$

In the optical disk apparatus, a focus error signal FE is generated by calculating the results of such current-to-voltage conversion through execution of the calculation expressed below, and then focus control is performed by moving the objective lens 36 to adjust the focus error signal FE to a predetermined signal level.

[Expression 2]

$$FE=(a+b)-(b+c) \quad (2)$$

Further the following calculation is executed according to the expression shown below, thereby generating a reproduced signal RF from the sensed results of the receiving light used for generation of the focus error signal.

[Expression 3]

$$RF=(a+b+c+d) \quad (3)$$

More specifically, when the lengths of the optical paths of two luminous fluxes composed of the return light are thus rendered different from each other, as shown in FIG. 3, one luminous flux forms a focal point on the light receiving plane, while the other luminous flux is condensed on the light receiving plane in the shape of a large-diameter beam spot anterior or posterior to the focal point (FIGS. 3(A) and 3(C)). FIG. 3(A) represents one case where the objective lens 36 is proximate to the optical disk 5, while FIG. 3(C) represents another case where the objective lens 36 recedes from the optical disk 5 to the contrary.

Thus, it becomes possible in this embodiment to avoid an undesired situation where the entire amount of the return light is condensed on the dead region of the light sensor, hence realizing generation of a reproduced signal RF on the basis of the sensed results of the received light used for generation of the focus error signal. Consequently, the whole structure can be simplified correspondingly thereto.

In this embodiment, for the purpose of diminishing the reproduced-signal level variation caused due to the dead region of the light receiving plane, the individual optical systems are set in such a manner that each luminous flux forms a focal point on the light receiving plane in the forward direction of each flux from the dead region, in case the luminous flux transmitted through the optical path length difference plate 39 and the remaining luminous flux form respective focal points on the light receiving planes of the light sensor 38 (i.e., as shown in FIGS. 3(A) and 3(C) respectively).

Thus, when the optical paths are mutually different in length, if focus control is so performed as to equalize the diameters of beam spots formed on the light receiving plane by two luminous fluxes, then, as shown in FIG. 3(B), one luminous flux is condensed anterior to the focal point, while the other luminous flux is condensed posterior to the focal point. Accordingly, in comparison with a known case where respective focal points are formed, focus control can be so executed as to attain a control target state with large beam diameters, hence achieving effective avoidance of any sharp characteristic change of the focus error signal derived from the horizontal positional deviation.

Figure 4:
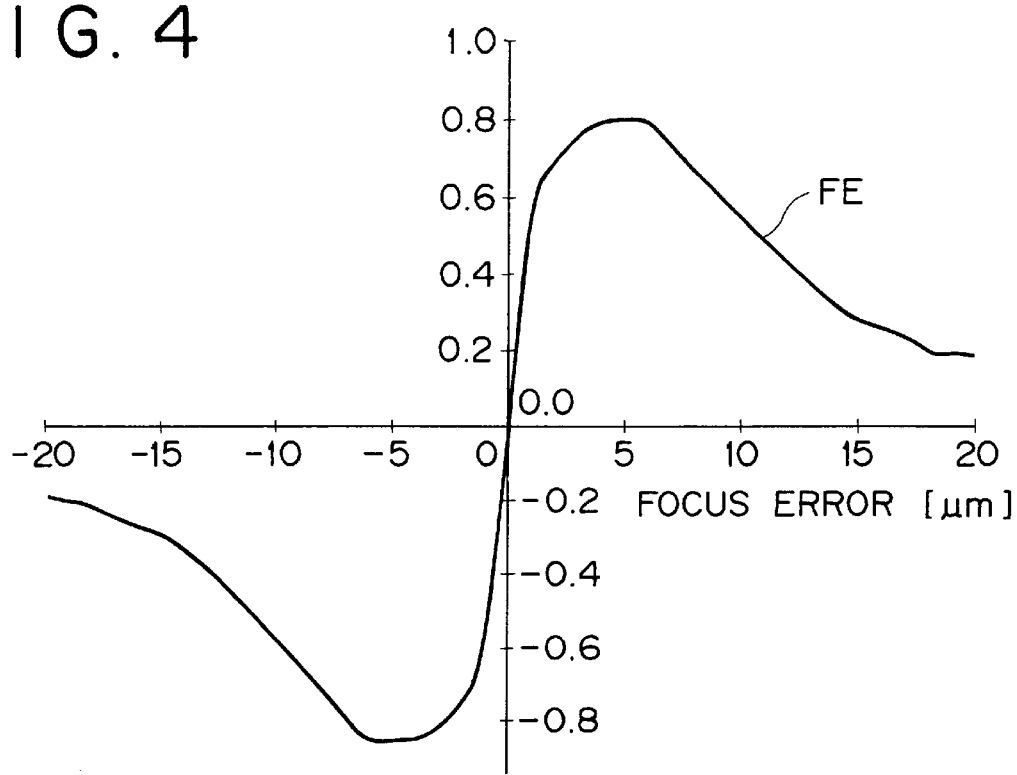
FIG. 4 is a characteristic curve diagram showing a focus error signal obtained in the optical pickup of FIG. 1.
Figure 5:
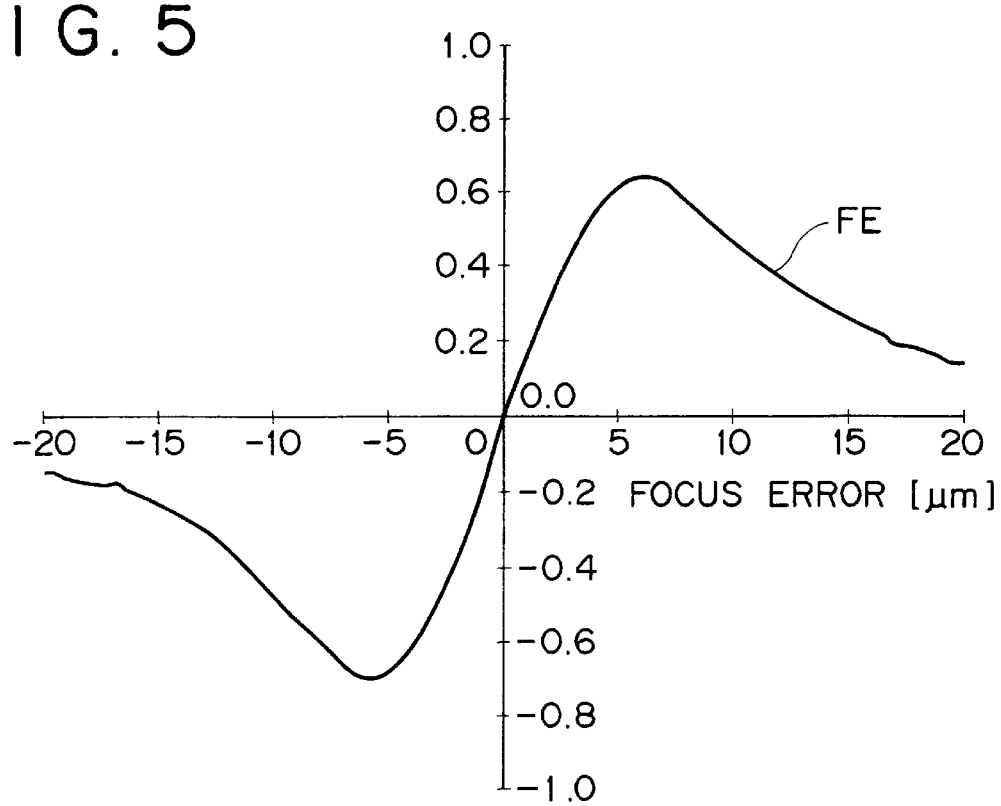
FIG. 5 is a characteristic curve diagram showing some characteristic changes caused by horizontal positional deviation in comparison with the characteristic curve of FIG. 4.

FIGS. 4 and 5 are characteristic curve diagrams that graphically show characteristic changes caused in the focus error signal FE due to the horizontal positional deviation. FIG. 4 represents a state where the optical pickup is assembled properly, and FIG. 5 represents another state where the horizontal positional deviation is such that the characteristic deterioration is rendered conspicuous by the dead region in the structure mentioned and described with regard to FIG. 11.

According to FIGS. 4 and 5, it is obvious that generation of a dead region can be avoided effectively, although the sensitivity is somewhat lowered.

(1-2) Operation of the First Embodiment

In the optical pickup 31 (FIG. 1) of the above structure, the laser beam L1 emitted from the semiconductor laser 32 is resolved into −1st, 0th and 1st degree diffracted light by the grating 33 and then is transmitted through the beam splitter 34. Thereafter, the beam is converted by the collimator lens 35 substantially into parallel light rays, which are subsequently condensed by the objective lens 36 onto the information recording plane of the optical disk 5.

In the optical pickup 31, return light L2 is obtained from the optical disk 5 and then is converted by the collimator lens 35 into convergent light rays, which are subsequently reflected by the beam splitter 34 so that the optical path thereof is separated from the optical path of the laser beam L1. Thereafter the beam is split by the Foucault prism 37 into two luminous fluxes having mutually different outgoing directions. These two luminous fluxes are received by the light sensor 38. In this stage, one of such two luminous fluxes is transmitted through the optical path length difference plate 39, whereby the length of the optical path thereof up to the light sensor 38 is rendered different from that of the other luminous flux, and subsequently the two luminous fluxes are introduced to the light sensor 38.

In the light sensor 38 (FIGS. 2 and 3), with regard to one luminous flux composed of the return light and transmitted through the optical path length difference plate 39, the return light rays corresponding to the −1st, 0th, 1st degree diffracted light rays are received respectively by the light receiving planes f, cd, h which are arrayed in the circumference tangential direction of the optical disk 5. Meanwhile, with regard to the other luminous flux not transmitted through the optical path length difference plate 39, the return light rays are received respectively by the light receiving planes e, ab, g arrayed in the circumference tangential direction of the optical disk 5.

In this case, the lengths of the optical paths of the two luminous fluxes are set to be mutually different by the optical path length difference plate 39, so that even when one luminous flux forms a focal point, the other luminous flux is condensed on the light receiving plane with a large-diameter beam spot anterior or posterior to the focal point. Consequently, in this embodiment, it is possible to avoid an undesired situation where the entire amount of the return light is condensed on the dead region of the light sensor, hence realizing generation of a reproduced signal RF on the basis of the sensed results of the received light used for generation of the focus error signal.

That is, regarding the return light, the sensed results of the received light on the light receiving planes a, b, c, d are processed through current-to-voltage conversion and then are added together, whereby a reproduced signal RF is generated. Thus, in the optical disk apparatus, a reproduced signal can be generated on the basis of the sensed results of the received light used for generation of the focus error signal FE, so that the structure of the optical pickup 31 can be simplified correspondingly thereto to eventually simplify the whole structure of the apparatus.

In this embodiment, the optical system is so set that, when each luminous flux forms a focal point on the light receiving plane, the return light is focused at a position spaced apart in the forward direction of the luminous flux from the dead region of the light receiving plane, wherein a reproduced signal is generated on the basis of the sensed results of the received light used for generation of the focus error signal, hence reducing any sharp change in the level of the reproduced signal.

Consequently, in the optical disk apparatus employing this optical pickup 31, a focus error signal FE is generated on the basis of the sensed results obtained from the center light receiving planes a, b, c, d, in such a manner as to equalize the diameters of beam spots formed on the light receiving planes by two luminous fluxes whose optical path lengths are thus rendered different from each other, and then focus control is executed in response to such a focus error signal FE.

In the optical disk apparatus, the return light transmitted through the optical path length difference plate 39 and the return light not transmitted therethrough are focused at points posterior and anterior to the light receiving planes respectively, and focus control can be so performed as to substantially equalize the beam diameters in the shape of large-diameter beam spots of the return light on the light receiving planes of the light sensor 38. Therefore, it becomes possible to prevent any sharp change that may be caused in the focus error signal by some horizontal positional deviation, hence preventing generation of a dead region due to the horizontal positional deviation.

Since it is possible to prevent deterioration of the focus error signal characteristic derived from such horizontal positional deviation, the noise induced at the time of traversing tracks can be diminished in the optical pickup represented by this embodiment, hence realizing a faster seek corresponding thereto to eventually shorten the required access time.

(1-3) Effects of First Embodiment

According to the above structure where the optical path difference plate is interposed between the Foucault prism and the light sensor, the optical paths of two luminous fluxes separated by the Foucault prism are rendered different in length from each other, so that deterioration of the focus error signal characteristic due to some horizontal positional deviation can be prevented in a simplified structure.

(2) Second Embodiment

Figure 6:
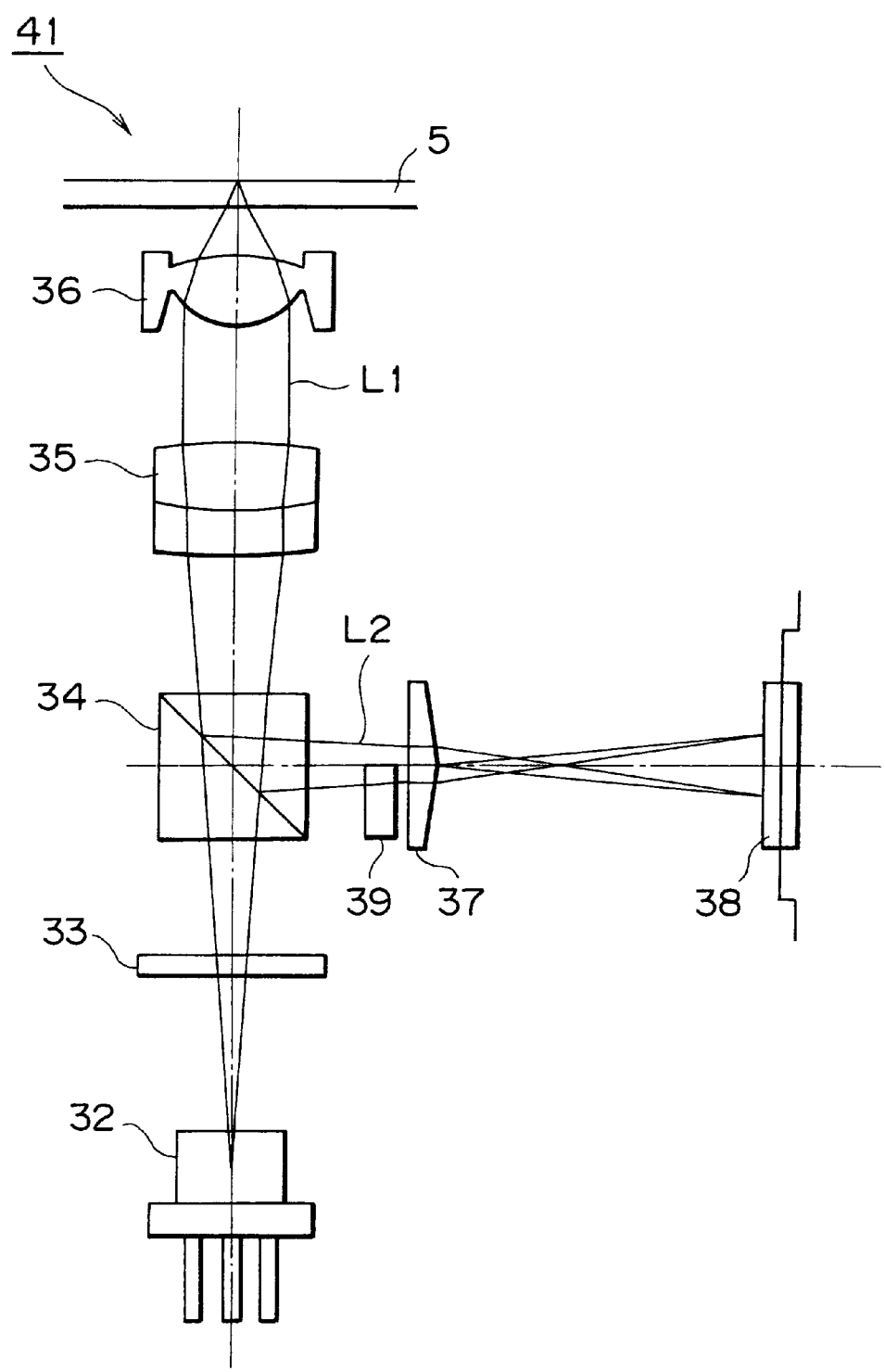
FIG. 6 is a schematic diagram of an optical pickup showing a second embodiment of the present invention.

FIG. 6 is a schematic diagram of an optical pickup for use in an optical disk apparatus relative to a second embodiment of the present invention. In the structure of FIG. 6, any component parts corresponding to those of the foregoing optical pickup 31 mentioned above with reference to FIG. 1 are denoted by like reference numerals, and a repeated explanation thereof is omitted here.

In this optical pickup 41, an optical path length difference plate 39 is disposed on the incidence plane side of a Foucault prism 37, instead of being interposed between the Foucault prism 37 and a light sensor. Thus, the effect of the first embodiment is also achievable by disposing, as shown in FIG. 6, an optical path length difference plate 39 on the incidence plane side of the Foucault prism.

(3) Third Embodiment

FIG. 7 is a schematic diagram of light receiving planes of a light sensor for use in an optical pickup of an optical disk apparatus relative to a third embodiment of the present invention. In the structure of FIG. 7, the light sensor 58 has two sets of light receiving planes 58A and 58B formed substantially in the radial direction of an optical disk 5, in the same manner as the foregoing light sensor 38 in the optical pickup mentioned and discussed in connection with FIG. 2.

The optical pickup in the third embodiment is structurally the same as the aforementioned optical pickup in the first embodiment, with the exception of the light sensor 58 and its peripheral component parts, so that a repeated explanation thereof is omitted here.

The two sets of light receiving planes 58A and 58B are formed to be the same in shape, and rectangular light receiving planes e, a, g and f, b, h are formed at a predetermined pitch substantially in the circumference tangential direction of the optical disk 5. In the light sensor 58, the center light receiving planes a and b, out of the entire rectangular light receiving planes e, a, g and f, b, h, are divided into three in the circumference tangential direction of the optical disk 5, and further tiny light receiving planes a1, a2, a3 and b1, b2, b3 are formed.

In the optical pickup 51 of this embodiment, as shown in FIG. 8 for comparison with FIG. 3, the entire return light is split into two luminous fluxes by a Foucault prism 37, and the return light incident via an optical path difference plate 39 is received on the light receiving plane 58A, while the other return light incident directly is received on the light receiving plane 58B. The component parts of the optical pick 51 are so disposed that, when the laser beam of 0th degree diffracted light, out of the entire laser beam L1 composed of −1st, 0th and 1st-degree diffracted light divided by a grating 33, is scanning the optical disk 5 in a just tracking state, the return light rays corresponding to the −1st, 0th and 1st-degree diffracted light rays are received respectively on the light receiving planes e, a, g and f, b, h.

Consequently, in this embodiment also, even when one of the two luminous fluxes is focused on the light receiving plane as shown in FIG. 8, the other luminous flux is condensed on the light receiving plane with a large-diameter beam spot anterior or posterior to the focal point, so that it becomes possible to effectively avoid any harmful influence of a dead region in the light sensor 58. FIG. 8(A) represents one case where the objective lens 36 is proximate to the optical disk 5, and FIG. 8(C) represents another case where the objective lens 36 recedes from the optical disk 5 to the contrary.

In the optical disk apparatus, the sensed results of the received light obtained from the light receiving planes a to h are processed through current-to-voltage conversion, and a tracking error signal TE is generated by executing the calculation expressed below, so as to perform tracking control according to the DPP method. In the following equation, A' denotes a predetermined coefficient.

[Expression 4]

$$TE=(a1+a2+a3)-(b1+b2+b3)-A'\ (e+g-f-h) \qquad (4)$$

In the optical disk apparatus, when tracking control is difficult by the tracking error signal TE of Eq. (4) as in the case of accessing an optical disk where the depth of pits has a quarter wavelength for example, a tracking error signal is generated on the basis of the tracking signal TE by the DPD (Differential Phase Direction) method according to the calculation of the following equation.

[Expression 5]

$$TE=(a1+b1)-(a3+b3) \qquad (5)$$

Also in the optical disk apparatus, a focus error signal FE is generated by executing the calculation of an equation (Expression 6) given below. In this manner, the optical disk apparatus generates a focus error signal FE by the SSD (Spot Size Detection) method.

[Expression 6]

$$FE = (a1+a3+b2) - (b1+b3+a2) \quad (6)$$

Further, a reproduced signal RF is generated by calculating the following equation.
[Expression 7]

$$RF = (a1+a2+a3) + (b1+b2+b3) \quad (7)$$

Figure 9:
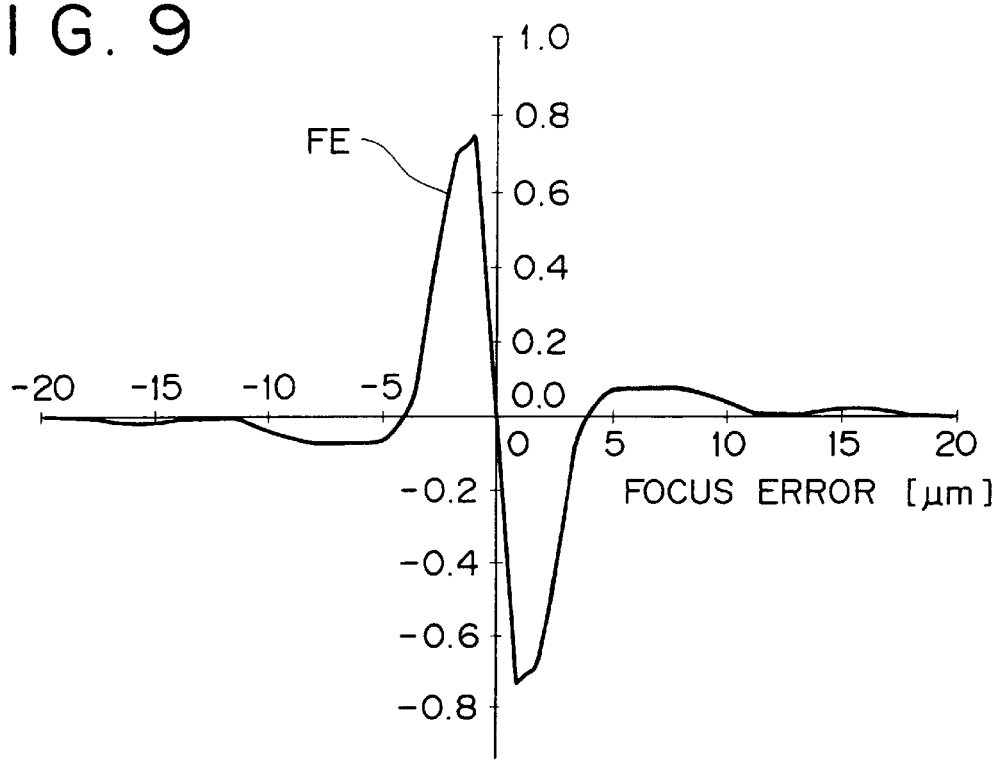
FIG. 9 is a characteristic curve diagram of a focus error signal obtained from an optical pickup using the light sensor of FIG. 7.
Figure 10:
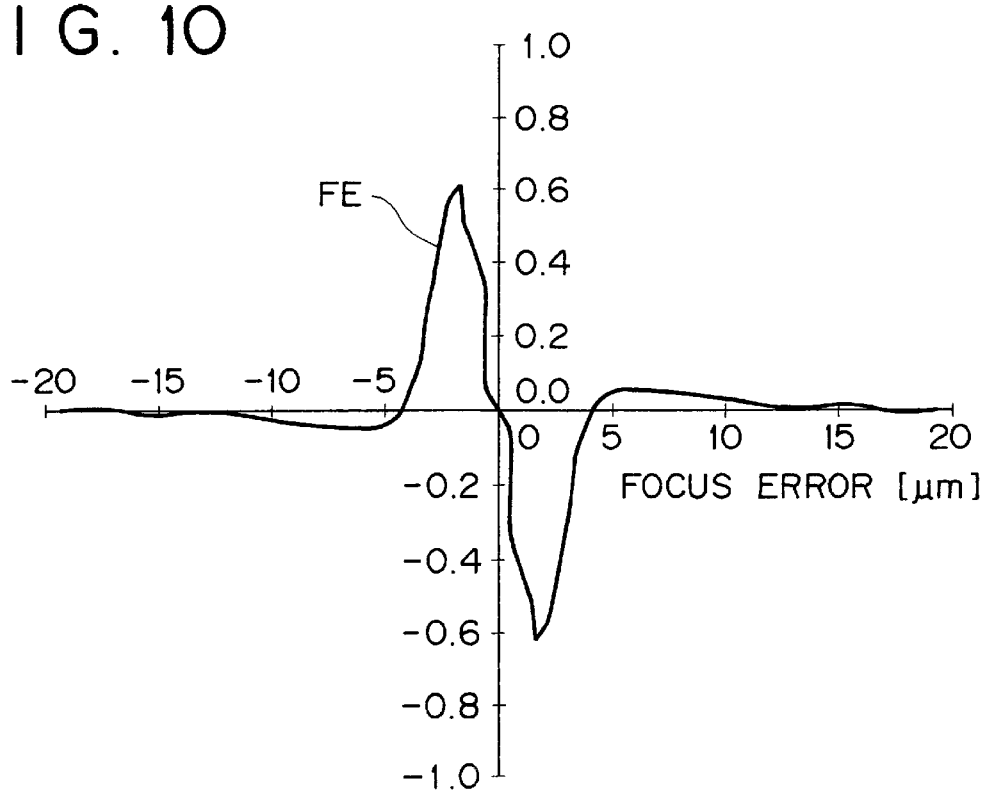
FIG. 10 is a characteristic curve diagram showing some characteristic changes caused by horizontal positional deviation in comparison with the characteristic curve diagram of FIG. 9.

FIGS. 9 and 10 are characteristic curve diagrams which graphically show characteristic changes caused in the focus error signal FE due to the horizontal positional deviation. FIG. 9 represents a state where the optical pickup is assembled properly, and FIG. 10 represents another state where the beam is deviated by an amount of 10 micrometers in the circumference tangential direction of the optical disk 5 toward the dead region on the light receiving planes 58A and 58B. According to FIGS. 9 and 10, it is obvious that any characteristic deterioration of the focus error signal derived from the dead region can be avoided effectively, although the sensitivity is somewhat lowered.

According to the third embodiment, if the light receiving plane of the light sensor is divided in the circumference tangential direction of the optical disk, it is also possible, in a simplified structure, to prevent the characteristic deterioration of the focus error signal due to the horizontal positional deviation.

(4) Other Embodiments

In any of the foregoing embodiments described above, the optical path difference plate 39 is disposed on each of the incidence plane side and the emission plane side of the Foucault prism to serve as an optical path difference generator means which renders different the lengths of optical paths of two luminous fluxes split by the Foucault prism. However, the present invention is not limited to such examples alone, and an optical member may be stuck, as an optical path difference generator means, to the incidence plane or the light receiving plane of the light sensor, or to the Foucault prism. And the Foucault prism may be made integrally with an optical path difference generator means at the time of processing a glass material, instead of sticking such an optical member.

Also in the above embodiments, a description has been given on an example where the optical path difference generator means is disposed in the optical path of one of the two luminous fluxes split by the Foucault prism. However, the present invention is not limited thereto alone. For instance, two transparent plates different mutually in thickness may be inserted in the optical paths of the two luminous fluxes, thereby rendering different the lengths of the optical paths of the two luminous fluxes.

Moreover, in the above embodiments, a description has been given on an example where the Foucault prism is so shaped as to protrude at its center, and the optical paths of the two split luminous fluxes intersect with each other. However, the present invention is not limited thereto alone. For instance, the Foucault prism may be so shaped as to recess at its center to the contrary, and the optical paths of the two split luminous fluxes may not intersect with each other.

Furthermore, in the above embodiments, a description has been given based on an example where the return light is reflected by the beam splitter and then is processed. However, the present invention is not limited thereto alone, and the structure may be so modified that the light source side and the light receiving side are mutually replaced.

Further in the above embodiments, a description has been given based on an example where a tracking error signal is generated by the DPP method. However, the present invention is not limited thereto alone, and it is widely applicable also to a case of generating a tracking error signal by a three-spot method as well.

Still further, in the above embodiments, a description has been given based on an example where a focus error signal is generated by detecting the difference between the diameters of beam spots obtained from the light receiving planes a to d divided in the radial direction of the optical disk. However, the present invention is not limited thereto alone. The essential point is to perform detection of the difference between the diameters of beam spots, and a variety of structures may be contrived with regard to the light receiving plane of the light sensor.

Further in the above embodiments, a description has been given based on an example where a Foucault prism is used as a means for splitting the return light into two luminous fluxes. However, the present invention is not limited thereto alone, and a hologram for instance may be employed as well, although some complication is inevitable in design and so forth as compared with the case of using a Foucault prism.

Thus, according to the present invention, an optical path length difference generator means is disposed in an optical path to produce an optical path length difference between two luminous fluxes obtained by resolving the return light, so that it becomes possible to prevent, in the simplified structure, any deterioration of the focus error signal characteristic derived from the horizontal positional deviation.

What is claimed is:

1. An optical pickup comprising:
    a laser source for emitting a light beam to a recording medium;
    a convergent optical system for introducing a return light from the recording medium in the form of convergent light;
    a luminous flux split means, including a beam splitter, for splitting the return light via the convergent optical system into two luminous fluxes, said two luminous fluxes have different optical axes inclined to the optical axis of said return light;
    a photo detector for receiving the two luminous fluxes in a manner to be capable of detecting the sizes of beam spots formed by the two luminous fluxes; and
    an optical path length difference generator for rendering different the lengths of the optical paths of said two luminous fluxes.

2. The optical pickup according to claim 1, wherein said optical path length difference length generator comprises a transparent parallel plate inserted in one of the optical paths of said two luminous fluxes.

3. The optical pickup according to claim 1, wherein said optical path length difference generator is interposed between said luminous flux split means and said photo detector.

4. The optical pickup according to claim 1, wherein said optical path length difference generator is interposed between said convergent optical system and said luminous flux split means.

5. The optical pickup according to claim 1, wherein said luminous flux split means is a Foucault prism.

6. An optical pickup according to claim 1, wherein said two luminous fluxes form two different focal points, said two different focal points have different distance from the recording medium.

7. The optical pickup according to claim 6, wherein said photo detector is disposed between the two focal points formed when the light beam is focused on the recording medium.

8. The optical pickup according to claim 1, wherein said two luminous fluxes form two different focal points so that the point and receives the other luminous flux after forming a focal point when the light beam is focused on the recording medium.

9. The optical pickup according to claim 1, wherein said photo detector detects an amount of a focus error on the sensed results of the photo detector.

10. The optical pickup according to claim 1, wherein said photo detector comprises a plurality of light receiving surfaces divided in a radial direction of the recording medium.

11. The optical pickup according to claim 1, wherein said photo detector comprises a plurality of light receiving surfaces divided in a tangential direction of the recording medium.

12. An optical disc apparatus for recording data on and/or reproducing data from an optical disc, comprising:
   a laser source for emitting a light beam to the optical disc;
   a convergent optical system for introducing a return light from the optical disc on the form of convergent light;
   a luminous flux split means for splitting the return light via the convergent optical system into two luminous fluxes, said two luminous fluxes have different optical axes inclined to the optical axis of said return light;
   a photo detector for receiving the two luminous fluxes in a manner to be capable of detecting the sizes of beam spots formed by the two luminous fluxes; and
   an optical path length difference generator means for rendering different the lengths of the optical paths of said two luminous fluxes,
   wherein the photo detector detects an amount of a focus error based on the sensed results of the photo detector.

13. The optical disc apparatus according to claim 12, wherein said optical path length difference generator means consists of a transparent parallel plate inserted in one of the optical paths of said two luminous fluxes.

14. The optical disc apparatus according to claim 12, wherein said optical path length difference generator means is interposed between said luminous flux split means and said photo detector.

15. The optical disc apparatus according to claim 12, wherein said optical path length difference generator means is interposed between said convergent optical system and said luminous flux split means.

16. The optical disc apparatus according to claim 12, wherein said luminous flux split means is a Foucault prism.

17. The optical disc apparatus according to claim 12, wherein said two luminous fluxes form two different focal points, said two different focal points have different distance from the optical disc.

18. The optical disc apparatus according to claim 17, wherein said photo detector is disposed between the two focal points formed when the light beam is focused on the optical disc.

19. The optical disc apparatus according to claim 12, wherein said two luminous fluxes form two different focal points so that the photo detector receives one luminous flux before forming focal point and receives the other luminous flux after forming focal point when the light beam is focused on the optical disc.

20. The optical disc apparatus according to claim 12, wherein said photo detector detects the data recorded on the optical disc.

21. The optical disc apparatus according to claim 12, wherein said photo detector comprises a plurality of light receiving surfaces divided in a radial direction of the optical disc.

22. The optical disc apparatus according to claim 12, wherein said photo detector comprises a plurality of light receiving surfaces divided in a tangential direction of the optical disc.

23. An optical pickup comprising:
   a laser source, said laser source emitting a light beam to a recording medium;
   a convergent optical system, said convergent optical system receiving a return light from said recording medium;
   a luminous flux split means, said luminous flux split means splitting said return light into a plurality of luminous fluxes, said plurality of luminous fluxes forming a plurality of beam spots, each luminous flux of said plurality of luminous fluxes forming a beam spot of said plurality of beam spots, said each luminous flux having an optical axes different from another luminous flux of said plurality of luminous fluxes;
   at least one optical path length difference generator including a first optical path length difference generator of said at least one optical path length difference generator, said first optical path length difference generator modifying the optical path length of a first luminous flux of said plurality of luminous fluxes, the optical path length of a second luminous flux of said plurality of luminous fluxes not being modified by said first optical path length difference generator; and
   a photo detector, said photo detector detecting said plurality of beam spots and receiving said first and second luminous fluxes.

24. The optical pickup according to claim 23, wherein said first luminous flux passes through said first optical path length difference generator, and said second luminous flux does not pass through said first optical path length difference generator.

25. The optical pickup according to claim 24, wherein the optical path of said first luminous flux is different than the optical path of said second luminous flux.

26. The optical pickup according to claim 24, wherein said at least one optical path length difference generator further comprises:
   a second optical path length difference generator, said second luminous flux passing through said second optical path length difference generator, said second optical path length difference generator modifying said optical path length of said second luminous flux.

27. The optical pickup according to claim 23, wherein said return light passes through said first optical path length difference generator prior to being split by said luminous flux split means.

28. The optical pickup according to claim 23, wherein a signal is generated from said plurality of beam spots, said signal being a focus error signal.

29. The optical pickup according to claim 23, wherein a signal is generated from said plurality of beam spots, said signal being a tracking error signal.

30. The optical pickup according to claim 23, wherein a signal is generated from said plurality of beam spots, said signal being a reproduced signal.

31. The optical pickup according to claim 23, wherein said photo detector detects the diameter of said beam spot.

32. The optical pickup according to claim 23, wherein said luminous flux split means is a Foucault prism.

33. The optical pickup according to claim 23, wherein said plurality of beam spots is two said beam spots.

34. The optical pickup according to claim 23, wherein said plurality of beam spots is three said beam spots.

35. The optical pickup according to claim 23, wherein said optical path length difference length generator is a transparent plate.

36. The optical pickup according to claim 23, wherein said optical path length difference length generator is a parallel plate.

37. An optical disc apparatus for recording data on and/or reproducing data from an optical disc, comprising:
- a laser source, said laser source emitting a light beam to a recording medium;
- a convergent optical system, said convergent optical system receiving a return light from said recording medium;
- a luminous flux split means, said luminous flux split means splitting said return light into a plurality of luminous fluxes, said plurality of luminous fluxes forming a plurality of beam spots, each luminous flux of said plurality of luminous fluxes forming a beam spot of said plurality of beam spots, said each luminous flux having an optical axes different from another luminous flux of said plurality of luminous fluxes;
- at least one optical path length difference generator including a first optical path length difference generator of said at least one optical path length difference generator, said first optical path length difference generator modifying the optical path length of a first luminous flux of said plurality of luminous fluxes, the optical path length of a second luminous flux of said plurality of luminous fluxes not being modified by said first optical path length difference generator; and
- a photo detector, said photo detector detecting said plurality of beam spots and receiving said first and second luminous fluxes.

38. The optical disc apparatus according to claim 37, wherein said first luminous flux passes through said first optical path length difference generator, and said second luminous flux does not pass through said first optical path length difference generator.

39. The optical disc apparatus according to claim 38, wherein the optical path of said first luminous flux is different than the optical path of said second luminous flux.

40. The optical disc apparatus according to claim 38, wherein said at least one optical path length difference generator further comprises:
- a second optical path length difference generator, said second luminous flux passing through said second optical path length difference generator, said second optical path length difference generator modifying said optical path length of said second luminous flux.

41. The optical disc apparatus according to claim 37, wherein said return light passes through said first optical path length difference generator prior to being split by said luminous flux split means.

42. The optical disc apparatus according to claim 37, wherein a signal is generated from said plurality of beam spots, said signal being a focus error signal.

43. The optical disc apparatus according to claim 37, wherein a signal is generated from said plurality of beam spots, said signal being a tracking error signal.

44. The optical disc apparatus according to claim 37, wherein a signal is generated from said plurality of beam spots, said signal being a reproduced signal.

45. The optical disc apparatus according to claim 37, wherein said photo detector detects the diameter of said beam spot.

46. The optical disc apparatus according to claim 37, wherein said luminous flux split means is a Foucault prism.

47. The optical disc apparatus according to claim 37, wherein said plurality of beam spots is two said beam spots.

48. The optical disc apparatus according to claim 37, wherein said plurality of beam spots is three said beam spots.

49. The optical disc apparatus according to claim 37, wherein said optical path length difference length generator is a transparent plate.

50. The optical disc apparatus according to claim 37, wherein said optical path length difference length generator is a parallel plate.

* * * * *